United States Patent
Pohlack et al.

(10) Patent No.: US 11,620,238 B1
(45) Date of Patent: Apr. 4, 2023

(54) HARDWARE BLINDING OF MEMORY ACCESS WITH EPOCH TRANSITIONS

(71) Applicant: Amazon Technologies, Inc., Seattle, WA (US)

(72) Inventors: Martin Pohlack, Dresden (DE); Uwe Dannowski, Moritzburg (DE); Pawel Wieczorkiewicz, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/185,752

(22) Filed: Feb. 25, 2021

(51) Int. Cl.
*G06F 12/14* (2006.01)
*G06F 12/084* (2016.01)
*G06F 12/1045* (2016.01)
*G06F 12/0891* (2016.01)
*G06F 12/0873* (2016.01)

(52) U.S. Cl.
CPC ........ *G06F 12/1433* (2013.01); *G06F 12/084* (2013.01); *G06F 12/0873* (2013.01); *G06F 12/0891* (2013.01); *G06F 12/1054* (2013.01); *G06F 12/1063* (2013.01)

(58) Field of Classification Search
CPC .............. G06F 12/1433; G06F 12/084; G06F 12/0873; G06F 12/0891; G06F 12/1054; G06F 12/1063
See application file for complete search history.

(56) References Cited

U.S. PATENT DOCUMENTS

| | | | |
|---|---|---|---|
| 5,923,847 | A | 7/1999 | Hagersten |
| 6,877,063 | B1 | 4/2005 | Allegrucci |
| 6,961,804 | B2 | 11/2005 | Denneau et al. |
| 10,311,229 | B1 | 6/2019 | Pohlack |

(Continued)

FOREIGN PATENT DOCUMENTS

| | | |
|---|---|---|
| CN | 105431862 A | 3/2016 |
| CN | 112596802 A | 4/2021 |

(Continued)

OTHER PUBLICATIONS

M. Neagu and L. Miclea, "Protecting cache memories through data scrambling technique," 2014 IEEE 10th International Conference on Intelligent Computer Communication and Processing (ICCP), 2014, pp. 297-303.*

(Continued)

*Primary Examiner* — Pierre Michel Bataille
(74) *Attorney, Agent, or Firm* — S. Scott Foster; Kowert, Hood, Munyon, Rankin & Goetzel, P.C.

(57) ABSTRACT

A computer system and associated methods are disclosed for mitigating side-channel attacks using a shared cache. The computer system includes a main memory, a shared cache and a cache controller for the shared cache including a scrambling function that scrambles addresses of memory accesses according to the respective scrambling keys selected for a sequence of time periods. Different cache tiers may implement different scrambling functions optimized to the architecture of each cache tier. Scrambling keys may be (Continued)

updated to reduce predictability of shared cache to memory address mappings. These updates may occur opportunistically, on demand or on specified schedule. Multiple scrambling keys may be simultaneously active during transitions between active time periods.

18 Claims, 9 Drawing Sheets

(56) References Cited

U.S. PATENT DOCUMENTS

| | | | |
|---|---|---|---|
| 10,528,736 | B1 | 7/2020 | Sobel |
| 10,868,665 | B1 | 12/2020 | Pohlack |
| 2002/0069335 | A1 | 6/2002 | Flylnn, Jr. |
| 2006/0026385 | A1 | 2/2006 | Dinechin |
| 2007/0028072 | A1 | 2/2007 | Hennessy |
| 2012/0137303 | A1 | 5/2012 | Okada |
| 2012/0317423 | A1 | 12/2012 | Dolgunov et al. |
| 2015/0326356 | A1* | 11/2015 | Guan ............... H04L 5/005 370/330 |
| 2016/0350244 | A1 | 12/2016 | Tsirkin |
| 2017/0147509 | A1* | 5/2017 | Nevers ............. G06F 12/1009 |
| 2017/0285976 | A1 | 10/2017 | Durham |
| 2018/0203803 | A1 | 7/2018 | Compton |
| 2019/0324912 | A1 | 10/2019 | Toivanen |
| 2020/0133867 | A1* | 4/2020 | Jia ................. G06F 12/1063 |
| 2022/0214901 | A1 | 7/2022 | Tsirkin |

FOREIGN PATENT DOCUMENTS

| | | | | |
|---|---|---|---|---|
| WO | WO-2009057094 A1 * | 5/2009 | ......... | G06F 12/1408 |
| WO | 2015013133 A1 | 1/2015 | | |
| WO | WO-2015013133 A1 * | 1/2015 | ......... | G06F 12/1408 |

OTHER PUBLICATIONS

M. Neagu, L. Miclea and S. Manich, "Interleaved scrambling technique: A novel low-power security layer for cache memories," 2014 19th IEEE European Test Symposium (ETS), 2014, pp. 1-2.*

M. -I. Neagu and L. Miclea, "Data scrambling in memories: A security measure," 2014 IEEE International Conference on Automation, Quality and Testing, Robotics, 2014, pp. 1-6.*

Hector Marco et al., "AMD Bulldozer Linux ASLR weakness: Reducing entropy by 87.5%", Retrieved from hmarco.org/bugs/AMD-Bulldozer-linux-ASLR-weakness-reducing-mmaped-files-by-eight.html, Mar. 24, 2015, pp. 1-6.

Mloinuddin K. Qureshi, "CEASER: Mitigating Conflict-Based Cache Attacks via Encrypted-Address and Remapping", 2018 51st Annual IEEE/ACM International Symposium on Microarchitecture, IEEE, pp. 1-13.

Mario Werner, et al., ScatterCache: Thwarting Cache Attacks via Cache Set Randomization, In Proceedings of the 28th USENIX Security Symposium, Aug. 14-16, 2019, pp. 1-19.

U.S. Appl. No. 17/084,336, filed Oct. 29, 2020, Martin Pohlack, et al.

* cited by examiner

```
┌─────────────────────────────────────────────────────────────┐
│ Receive at a memory cache an read access request for an    │
│ address of memory from a processor coupled to the memory   │
│ and the memory cache 400                                    │
└─────────────────────────────────────────────────────────────┘
                              │
                              ▼
┌─────────────────────────────────────────────────────────────┐
│ Identify one or more Cache Scrambling Keys (CSKs) for the  │
│ memory access, a current CSK defined according to a        │
│ current epoch and zero or more additional CSKs defined     │
│ according to respective previous epochs 410                │
└─────────────────────────────────────────────────────────────┘
                              │
                              ▼
┌─────────────────────────────────────────────────────────────┐
│ Divide the address into upper and lower portions, the      │
│ lower portion serving as an offset into a cache line and   │
│ the upper portion serving to identify a cache line within  │
│ the memory cache 420                                        │
└─────────────────────────────────────────────────────────────┘
                              │
                              ▼
┌─────────────────────────────────────────────────────────────┐
│ For each identified CSK, apply a scrambling function using │
│ the CSK to at least some of the upper portion of the       │
│ address bits of the address to generate an index           │
│ identifying a set of candidate cache memory locations for  │
│ the address of memory 430                                   │
└─────────────────────────────────────────────────────────────┘
                              │
                              ▼
┌─────────────────────────────────────────────────────────────┐
│ Use at least some of the upper portion of the address bits │
│ as a cache tag identifying a cache line associated with    │
│ the address of memory, where the used portion includes at  │
│ least all bits of the address affected by the scrambling   │
│ function 440                                                │
└─────────────────────────────────────────────────────────────┘
                              │
                              ▼
┌─────────────────────────────────────────────────────────────┐
│ Satisfy the access request using the identified cache line │
│ or using memory if no cache line is identified 450         │
└─────────────────────────────────────────────────────────────┘
```

FIG. 4

HARDWARE BLINDING OF MEMORY ACCESS WITH EPOCH TRANSITIONS

BACKGROUND

Virtualization of hardware has provided numerous benefits with respect to managing large-scale computing resources for many clients with diverse needs, allowing various computing resources to be efficiently shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a service provider and be provided with varying numbers of virtual machine resources on an "as needed" basis or at least on an "as requested" basis.

In some virtualization systems, multiple guest virtual machines (VMs) are instantiated on a physical host. These VM instances may be managed using a virtual machine manager (VMM) or hypervisor executing on the host. The VMM presents each virtual machine with isolated hardware resources. By design, each guest VM is unaware of other guest VMs co-located on the same host. Nonetheless, because some hardware resources on the host are necessarily shared among the co-located VMs, information leakage may occur across the VMs. In particular, some hosts employ a shared last level cache (LLC) of the central processing unit (CPU). The LLC thus includes cached data for all guest VMs residing on the host. This shared cache may be exploited in a form of "side-channel" attack, in which an attacker VM is able observe the interactions between a victim VM and the shared cache. The manner in which the victim VM uses the cache may reveal confidential information, such as for example encryption keys employed by the victim VM.

BRIEF DESCRIPTION OF THE DRAWINGS

FIG. 4 is a flowchart diagram illustrating a process for identifying a set of candidate cache lines to perform a requested memory read access including hardware-assisted obscuring of cache access patterns, according to some embodiments.

Figure 1:
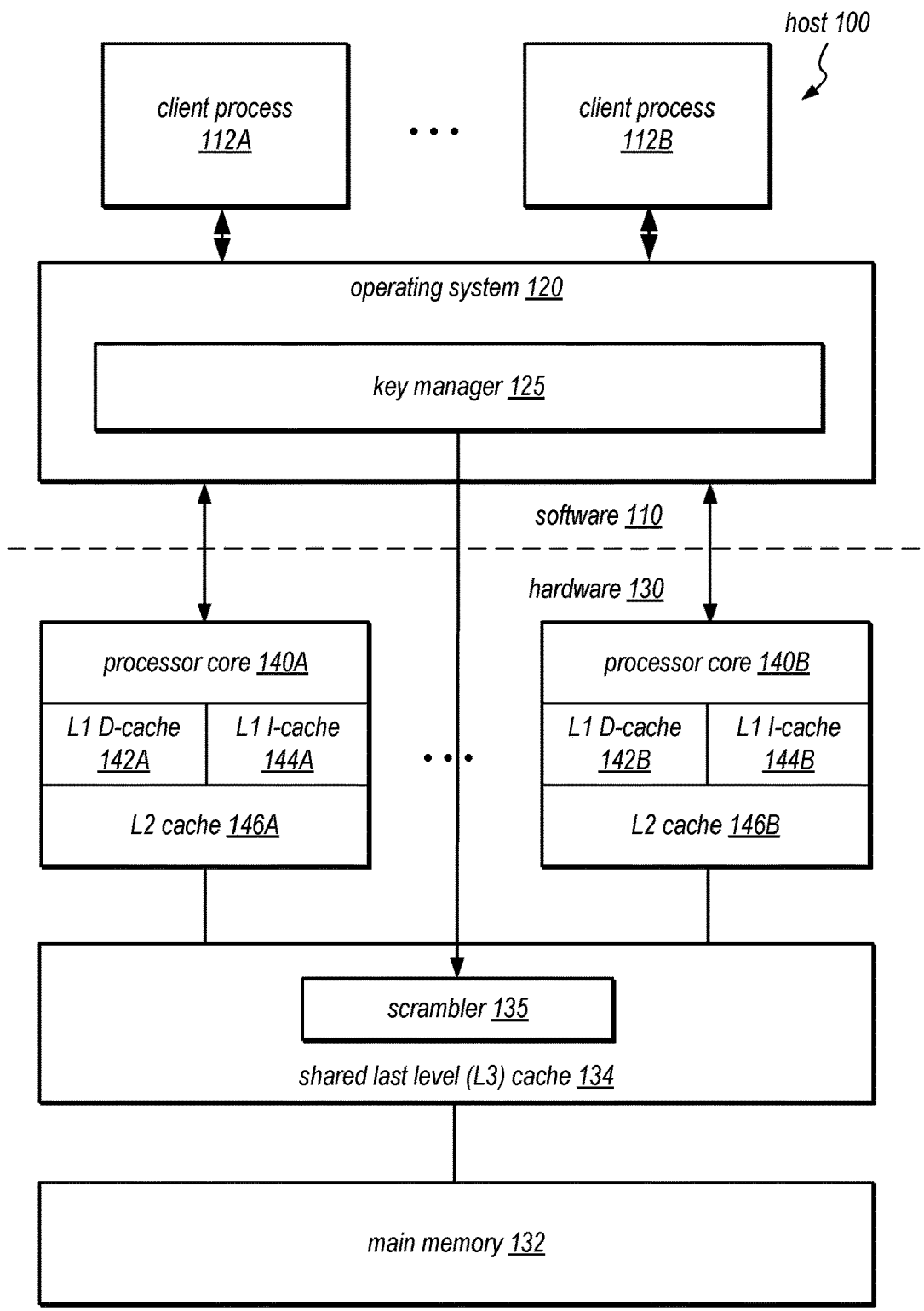
FIG. 1 is a block diagram illustrating an example computer system that implements hardware-assisted obscuring of cache access patterns to mitigate side-channel attacks that exploit a shared cache, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

Modern computing systems are often optimized for throughput and overall performance, but not necessarily for perfect isolation and constant-time execution of various operations. This opens up timing side channels between multiple parties that share such systems. The systems and methods described herein may be used to mitigate side-channel attacks in virtualized computing systems and/or in local systems in which a cache is shared between multiple instances of guest virtual machines (VMs) or applications residing on a host.

The term "side-channel" may refer to a channel of information flow in a computing system that was not intended for the use of processes or applications executing in the system, e.g., a channel of information flow that is not programmed explicitly by the operating system, but that can be opened in some systems in which shared resources are used, in some embodiments. For example, in a side-channel attack on a virtualization host, an attacker VM operating on the host may manipulate a cache that is shared between it and a victim VM co-located on the host, such that the attacker VM can observe the cache access of victim VM using the same cache. In that case, the shared cache represents a side channel over which information about the victim VM may be leaked.

A cache may be set-associative, that is, organized as S sets with W cache lines per set, in some embodiments. Thus, in an 8-way associative cache, each cache set contains 8 cache lines, which may hold up to 8 memory lines that map to the same cache set. A memory line in the cache may contain multiple addressable words of memory. When the cache is accessed, a cache set index field composed of least valued or least significant bits of the memory page address may be used to locate a cache set. The remaining highest valued or most significant bits may be used as an identifier, otherwise known as a tag or cache tag, for each cache line. After locating the cache set, the tag field of the address is matched against the tag of the W lines in the set to identify if one of the cache lines is a cache hit. As memory is much larger than the cache, more than W memory lines may map to the same cache set, potentially resulting in cache contention. If an access misses in the cache and all lines of the matching set are in use, one cache line must be evicted to free a cache slot for the new cache line. A cache's replacement policy (e.g., least-recently-used or LRU) may determine the line to evict.

One particular type of side-channel attack that exploits the cache is known as a prime and probe attack. In a prime and probe attack, an attacker VM first primes the shared cache by filling up certain cache sets in the cache with its own data. The attacker VM then waits for a victim VM to use the lines in these cache sets. After the wait period, the attacker VM probes the cache sets that were primed by accessing the lines in the cache sets. Based on the latency of these accesses, the attacker VM can infer which of its cached lines in the cache set had been replaced, possibly the victim VM. The attacker VM may re-prime the cache set during the probe phase, to prepare for the next round of accesses by the victim VM. In this manner, over time, the attacker VM may observe the memory access behavior of a victim VM, and extract information from this these observed accesses.

For example, in one particular attack, the attacker may extract a key that is used in an encryption algorithm from the observed cache access pattern. For example, the open source encryption software library GnuPG employs a square-and-multiply exponentiation algorithm as part of basic encryption and decryption operations in RSA-based encryption systems. In an RSA decryption, the decryption key is the exponent e. The square-and-multiply algorithm carries out the calculation by iterating over the binary digits of the exponent e, performing different operations at each step of the iteration, depending on whether a particular digit of exponent is a 0 or a 1. It has been documented that on some systems, the square-and-multiply algorithm produces a memory access pattern that reveals the digits of the exponent e. A number of other techniques are known to extract other types of information from a program's memory usage patterns.

Attacks can also aim at data. For example, monitoring of portions of a lookup table used in a software implementation of a symmetric encryption function, which again, allows to gather information about the cryptographic key currently being used.

In order to efficiently carry out such attacks, the attacker VM may have to consistently write to particular areas of the cache. This is because the shared cache is often a high-level cache that is very large in size, and thus it may be impossible to monitor every cache set in the shared cache using prime and probe. The attacker VM may have to identify a particular cache set to monitor and then construct an eviction set that is consistently mapped to that cache set. This eviction set is then used to repeatedly prime and probe the targeted cache set in the shared cache.

Virtual machines may also exploit this lack of isolation to establish covert communication channels that otherwise are not allowed to exist. The possibility to deterministically sense changes of cache state (via timing side-channel) enables two cooperating parties to establish a reliable communication protocol with sufficient bandwidth to either extract information or even establish an interactive control session. Again, the isolation promise is broken and deep content inspection may have to be performed to gain confidence into the isolation property.

Existing mitigation strategies for these attacks, for example constant time operations, using hardware implementations for symmetric cryptography, all require changes in the victim programs because ultimately the system does not offer perfect isolation between parties. Some computing systems may provide processor extensions to allow main memory to be encrypted during execution but, while this may improve isolation, the locations of the data and code remain unchanged. Content is not moved to different positions in memory while being encrypted and this leaves the above attack vectors open. Cache line usage can still be monitored in virtualized environments with multiple guests, for example in cloud computing services.

Various techniques to mitigate attacks that exploit a shared cache using hardware-assisted obscuring of cache access patterns are described herein. These systems and methods make placement of cache lines unpredictable through varying of placement of the cache lines over time.

FIG. 1 is a block diagram illustrating an example computer system that implements hardware-assisted obscuring of cache access patterns to mitigate side-channel attacks that exploit a shared cache, according to some embodiments. The system may include a host 100, which includes software 110 that executes on hardware 130.

The hardware 130 may include one or more multi-core processors that each comprise multiple processor cores 140A, 140B, etc. These processor cores may act as separate instruction processing units. The cores may process instructions concurrently, thus increasing the overall speed of the combined processing unit. In some embodiments, processor cores 140A and 140B may reside on a single integrated circuit or chip.

The hardware 130 may also include a main memory 132 addressable by the processor cores which may be the main runtime memory of the host. The main memory 132 may be a form of volatile memory such as dynamic random-access memory (DRAM) or static random-access memory (SRAM). In some embodiments, the main memory 132 may be located in one or more chips or devices different from the processor cores. The host 100 may execute an operating system 120 that manages the main memory 132 for programs of client processes 112 executing on the host 100. When a program needs memory, it may request memory from the operating system, in units called frames or pages.

The hardware 130 may include a shared last level cache (LLC) 134. The LLC 134 may act as a cache on the main memory 132, which is smaller than the main memory 132, but faster to access. In some embodiments, the LLC 134 is located on the processor chip. As depicted, the LLC 134 is a level 3 (L3) cache, which may represent the highest level or tier of the cache hierarchy. As shown, the LLC 134 is shared by all processor cores 140A, 140B, etc. This sharing may be implemented using a fast communication interface on the processor chip(s). However, accessing the LLC 134 is still slower than accessing lower levels of the cache hierarchy that may be local to the individual processor cores 140. In some embodiments, the LLC 134 is an inclusive cache, meaning that it contains all cache entries of lower levels of cache in the cache hierarchy, including the L1 D-cache 142, the L1 I-cache 144, and the L2 cache 146.

As depicted, each processor core 140 may also have its own local cache, which may include an L1 data cache (D-cache) 142, an L1 instruction cache (I-cache) 144, and an L2 cache 146. The L1 D-cache 142 may be a data cache to speed up data fetch and store, and the L1 I-cache 144 may be an instruction cache to speed up executable instruction fetch. The L2 cache 144 may not be split and into an instruction cache and a data cache. The L2 cache 146 may be larger than the L1 cache, but slower to access than the L1 cache.

Also shown in the LLC 134 is a scrambler 135 which controls mappings between addresses of memory accesses and cache sets. To implement this control of mappings, the scrambler 135 receives parameters in the form of Cache Scrambling Keys (CSKs) from a key manager 125 within the operating system 120 as discussed further below. While the scrambler 135 is shown as part of the LLC 134, in some embodiments different scrambler components may also be using in other levels, or tiers, of the cache, including the L1 caches 142 and 144 and the L2 caches 146, and these scrambler components may differ in function between the various cache levels so as to optimize the function of the scrambler for the particular architecture of each cache level. Furthermore, a system may employ more or fewer levels of cache than is shown in FIG. 1, with different scramblers implementing in some or all the different cache levels, and those of ordinary skill in the art will recognize that the cache organization shown in FIG. 1 is merely an example and is not intended to be limiting.

In operation, data is transferred between the main memory 132 and cache hierarchy in blocks of fixed size, called cache lines or cache blocks. When a cache line is copied from the main memory 132 into the cache, a cache entry is created. The cache entry will include the copied data as well as an indicator of requested main memory location, called a tag. When the processor 140 needs to read or write a location in main memory, the system first checks for a corresponding entry in a first level of cache. If the requested memory location is in the first level, a cache hit has occurred, and the processor simply reads or writes the data in the cache line. However, if the processor does not find the memory location in the first level, the processor 140 proceeds to the next level of the cache hierarchy, and so on, until an entry is found. If the memory location is not found at any level in the cache hierarchy, a cache miss has occurred. In this case, a new cache entry is allocated and data from the main memory 132 is copied into the cache hierarchy, after which the request may be fulfilled from the contents of the cache. Because the slower main memory 132 is accessed during a cache miss, the processor 140 will experience a significant added latency for a memory access that generates a cache miss. The precise details of cache management will be different based on the hardware platform.

The software 110 of the host 100 may comprise an operating system 120 that supports one or more client processes 112A, 112B, etc. The operating system 120 may include one or more modules capable of instantiating and managing the different client processes 112. The operating system 120 may also include a key manager 125 which may generate CSKs for use in the scrambler(s) 135. CSKs may be periodically changed to obscure cache access patterns, as discussed below in FIG. 6. In embodiments implementing different scramblers 135 for different cache levels, CSKs may be updated at different periodic or aperiodic rates optimized to the particular architecture and function of each cache level.

A client process 112 may execute all of portions of an application on behalf of a client directly or through implementation of one or more virtual machines (VMs). A VM may include one or more compute instances with a specified computational capacity which may be specified by indicating the type and number of processor cores, the main memory size, and so on and a specified software stack e.g. a particular version of an operating system which may in turn run on top of a hypervisor within the operating system 120. One or more different computing devices may be used singly or in combination to implement the VM instances on the virtualization host. The computing devices may include general purpose or special purpose computers, storage devices, network devices and the like. The instances may operate or implement a variety of different platforms, such as application server instances, JAVA™ virtual machines (JVMs), general purpose or special-purpose operating systems, platforms that support various interpreted or compiled programming languages such as RUBY, PERL, PYTHON, C, C++ and the like, or high-performance computing platforms suitable for performing client applications. Different instances may have different numbers of virtual processor cores, and different amounts of memory, cache, storage and/or networking capacity, as well as any other performance characteristics. Configurations of instances may include their location, in a particular data center, availability zone, geographic, location, etc., and (in the case of reserved compute instances) reservation term length.

VMs executing within the client processes 112 may be instantiated to provide a variety of services that allow clients to use computing resources in a service provider network. These VMs can, for example, provide access to generic compute instances. The service provider network can also provide access to specialized compute instances with specialized functionality, such as routers, domain name systems (DNSs), load balancers, desktop virtualization servers, and the like. The service provider network may include various types of storage services that expose different types of storage access interfaces, including block-based storage services, relational database services, NoSQL database services, file system services, and the like. The service provider network may also include services that provide functionalities of commonly used software modules, which can be used in conjunction with other software to implement larger systems. For example, provided services may include queuing services, notification services, logging services, key storage and management services, and the like. The provided services may include services that implement larger systems with sophisticated functionality, such as machine learning, identity management, software development environments, multi-tenant containers for hosting software tenants, and the like. The services may be standard services provided by the service provider, or services implemented by third parties on top of the standard services. The services may operate on computing resources of the service provider network, and may be controlled and configured by clients via various interfaces such as graphical user interface (GUI) (e.g., as part of an administration control panel or web site) and/or as a programmatic interface such as an Application Programming Interface (API). As the services operate on the service provider's computing resources, usage or performance metrics data may be generated and captured.

Some implementations of the provider network may be a cloud provider network. A cloud provider network (sometimes referred to simply as a "cloud") refers to a pool of network-accessible computing resources (such as compute, storage, and networking resources, applications, and services), which may be virtualized or bare-metal. The cloud may provide convenient, on-demand network access to a shared pool of configurable computing resources that may be programmatically provisioned and released in response to customer commands. These resources may be dynamically provisioned and reconfigured to adjust to variable load. Cloud computing may thus be considered as both the applications delivered as services over a publicly accessible network (e.g., the Internet, a cellular communication network) and the hardware and software in cloud provider data centers that provide those services.

A cloud provider network may be formed as a number of regions, where a region is a separate geographical area in which the cloud provider clusters data centers. Each region may include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers may connect to availability zones of the cloud provider network via a publicly accessible network (e.g., the Internet, a cellular communication network) by way of a transit center (TC). TCs may be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region may operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

Computing service(s) may implement various computing resources at one or more data centers. The computing services may include an elastic compute cloud service (referred to in various implementations as an elastic compute service, a virtual machines service, a computing cloud service, a compute engine, or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type may have a specific ratio of processing, local storage, memory, and networking resources, and different instance families may have differing types of these resources as well. Multiple sizes of these resource configurations may be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The computing services may also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application may be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications may be "containerized" by packaging the software application in an appropriate manner and generating other artifacts (e.g., a container image, container file, other configurations) used to enable the application to run in a container engine. A container engine may run on a virtual machine instance in some implementations, with the virtual machine instance selected based at least partly on the described network performance metrics.

Figure 2:
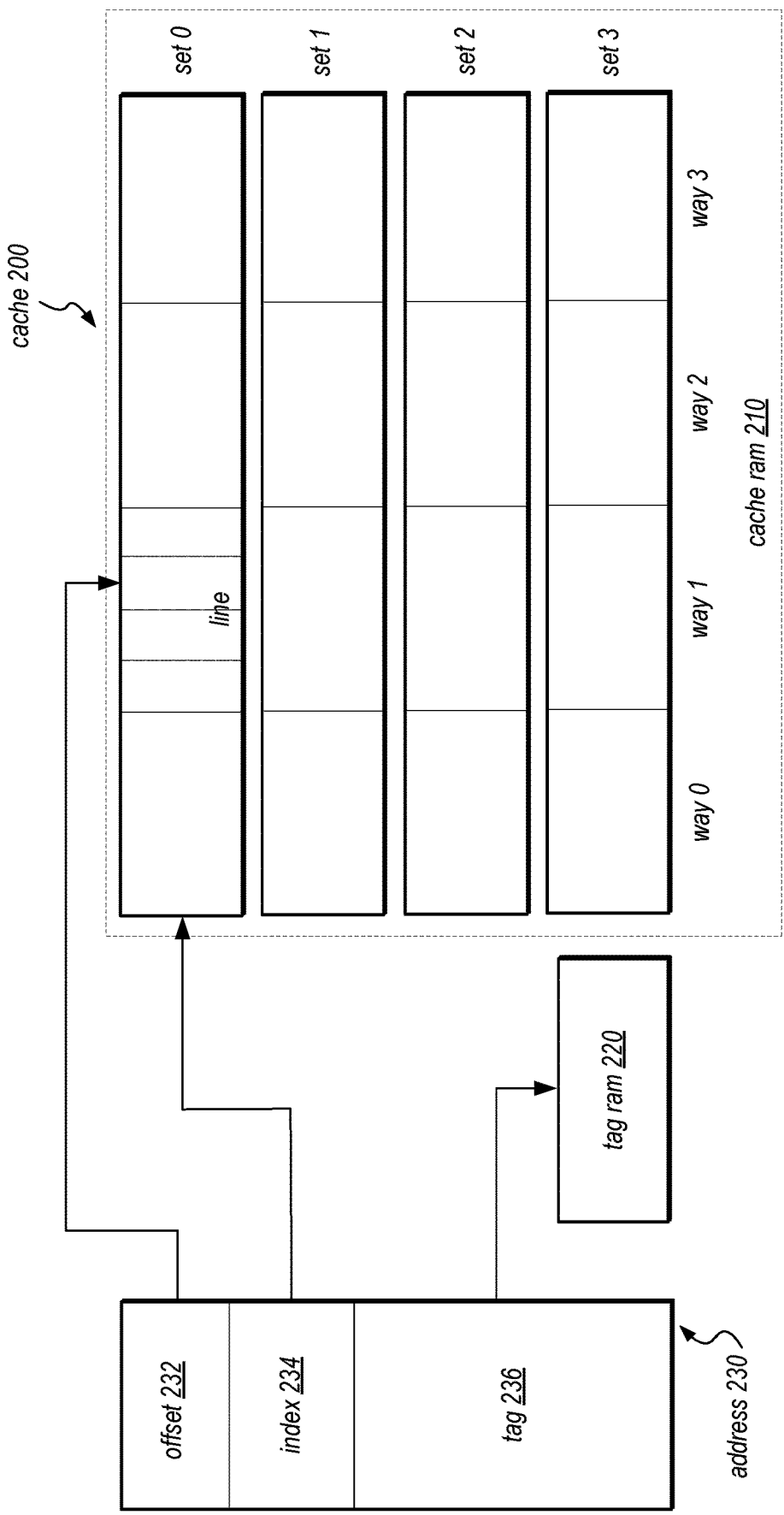
FIG. 2 illustrates the operations of a cache for a computer memory system, according to some embodiments.

FIG. 2 illustrates the operations of a cache for a computer memory system, according to various embodiments. A cache 200 may include a cache ram 210 and a tag ram 220. Data stored in the cache may be stored in the cache ram 210 while data information identifying specific data stored in the cache, otherwise known as tags or cache tags, may be stored in the tag ram 220. The tag ram 220 may include multiple entries, not shown, where each entry in the cache has a corresponding element in the cache ram 210 and an identifying entry in the tag ram 220.

The cache may be organized as a collection of cache blocks or lines. Each cache line may include one or more processor-addressable words of memory identifiable using a memory address 230. Individual cache lines are organized into sets of cache lines, shown as sets 0-3 in FIG. 2, where a particular memory word may be stored in only one set of cache lines but may be stored in any one of the cache lines within that set. The number of cache lines within a set defines the set-associativity of the cache, shown as ways 0-3 in FIG. 2, where the set-associativity is the number of locations with the cache that an individual memory element can be stored. The total size of the cache, in machine-addressable words, is equal to the number of sets in the cache times the set-associativity.

FIG. 2 shows an example cache organized as a 4-way set-associative cache using cache lines of 4 machine words. Such an example is chosen for clarity of explanation and is not intended to be limiting. Set associative caches may include cache lines of a wide range of sizes in various embodiments from a single machine word to many tens or even hundreds of machine words, although for performance reasons cache line sizes may frequently be powers of two. Likewise, in various embodiments set-associativity may vary from a single line, otherwise known as a direct mapped cache, to a large number of lines. Furthermore, cache subsystems frequently include multiple cache levels, such as cache levels 134, 142, 144 and 146 of FIG. 1, where different levels of the cache subsystem have different configurations of cache line and set associativity sizes to meet differing performance requirements.

To perform a memory access, the cache 200 may receive a memory address 230. In some embodiments, this address may represent a physical address of memory while in other embodiments the address may be a virtual address. The cache may divide the address into three contiguous portions of address bits. The first portion includes a contiguous portion of least significant bits that are used to select a particular memory word within the cache line. In the example configuration of FIG. 2, this first portion, the offset 232, would include the 2 least significant bits, containing the values 0-3, corresponding to the 4 machine words of a cache line.

A second portion of the memory address, the index 234, will contain the next least significant bits of the memory address to identify the cache set. In the example configuration of FIG. 2, this second portion would also include 2 bits, containing the values 0-3, corresponding to the 4 cache sets.

The combined portion including the first portion and second portion of the memory address would therefore include the 4 least significant bits. The remaining most significant bits of the memory address would be included in the third portion, the tag 236. The tag 236 may be used to identify the particular memory address in the cache using the tag ram 220.

For an access of the memory address, the cache identifies a particular set, using the index 234, in the cache where the contents of the memory may be found, then searches each of the ways 0-3 of the identified cache set to see if the tag 236 is stored in the respective entries of the tag ram 220. If an entry in the tag ram 220 contains the tag 236, then the contents of the memory address is stored in the cache ram 210 in the line associated with the tag ram entry. The cache may then satisfy the memory access using the particular cache line and the offset 232.

Figure 3:
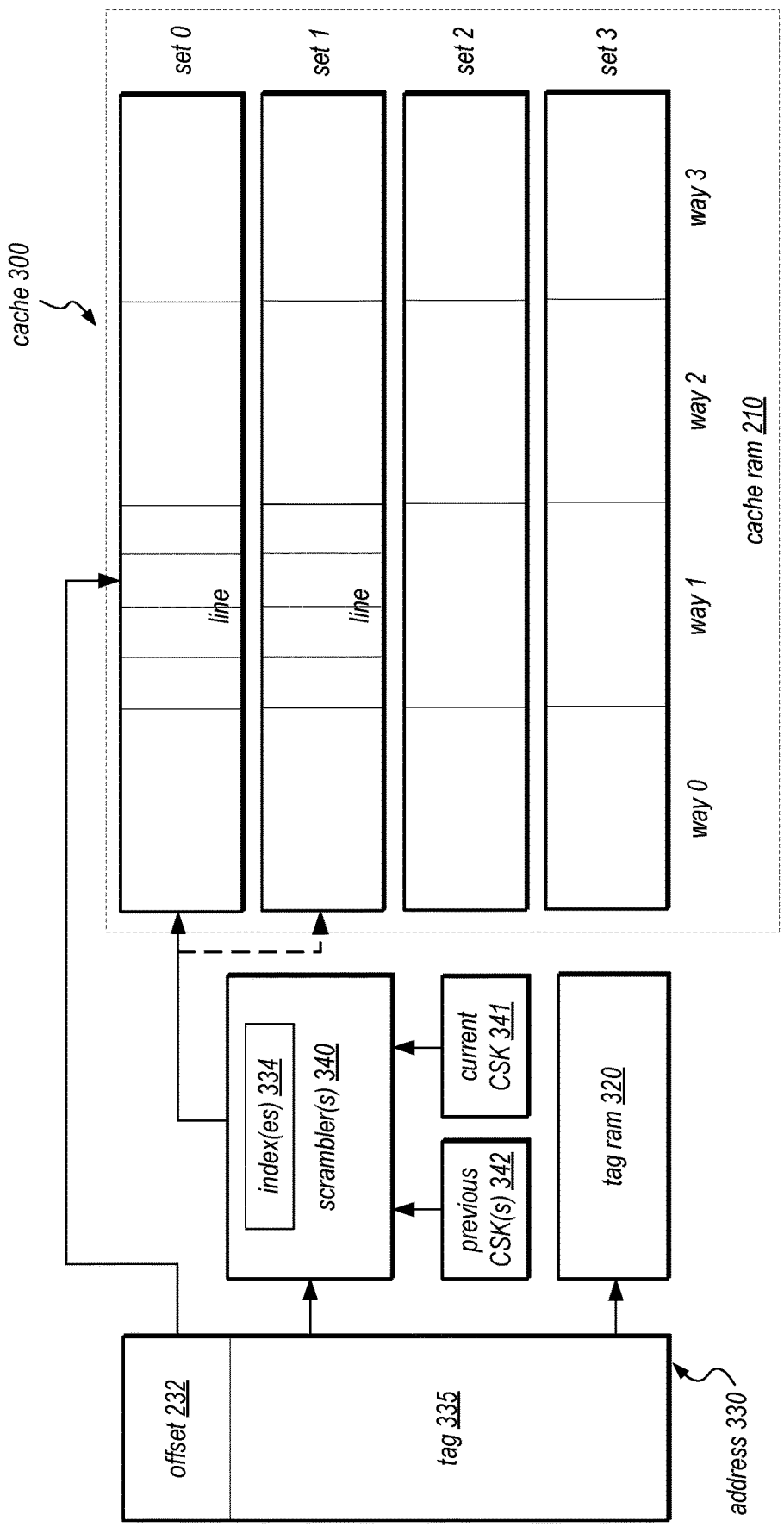
FIG. 3 illustrates the operations of a cache for a computer memory system that includes a scrambling function to mitigate side-channel attacks that exploit a shared cache, according to some embodiments.

FIG. 3 illustrates the operations of a cache for a computer memory system that includes a scrambling function to mitigate side-channel attacks that exploit a shared cache, according to some embodiments. A cache 300 may include a cache ram 210 and a tag ram 320. Data stored in the cache may be stored in the cache ram 210 while data information identifying specific data stored in the cache, otherwise known as tags or cache tags, may be stored in the tag ram 320. The tag ram 320 may include multiple entries, not shown, where each entry in the cache has a corresponding element in the cache ram 210 and an identifying entry in the tag ram 320. In addition, in some embodiments individual entries in the tag ram 320 may include information identifying an associated CSK for that particular cache element to assist in various cache operations such as cache epoch transitions and cache write operations, such as is discussed below in FIGS. 5-7.

The cache may be organized as a collection of cache blocks or lines. Each cache line may include one or more processor-addressable words of memory identifiable using a memory address 330. Individual cache lines are organized into sets of cache lines, shown as sets 0-3 in FIG. 3, where a particular memory word may be stored in only one set of cache lines but may be stored in any one of the cache lines within that set. The number of cache lines within a set defines the set-associativity of the cache, shown as ways 0-3 in FIG. 3, where the set-associativity is the number of locations with the cache that an individual memory element can be stored. The total size of the cache, in machine-addressable words, is equal to the number of sets in the cache times the set-associativity.

FIG. 3 shows an example cache organized as a 4-way set-associative cache using cache lines of 4 machine words. Such an example is chosen for clarity of explanation and is not intended to be limiting. Set associative caches may include cache lines of a wide range of sizes in various embodiments from a single machine word to many tens or even hundreds of machine words, although for performance reasons cache line sizes may frequently be powers of two. Likewise, in various embodiments set-associativity may vary from a single line, otherwise known as a direct mapped cache, to a large number of lines. Furthermore, cache subsystems frequently include multiple cache levels, such as cache levels 134, 142, 144 and 146 of FIG. 1, where different levels of the cache subsystem have different configurations of cache line and set associativity sizes to meet differing performance requirements.

To perform a memory access, the cache 300 may receive a memory address 330. In some embodiments, this address may represent a physical address of memory while in other embodiments in may be a virtual address. The cache may divide the address into two contiguous portions of address bits. The first portion includes a contiguous portion of least significant bits that are used to select a particular memory word within the cache line. In the example configuration of FIG. 3, this first portion, the offset 232, would include the 2 least significant bits, containing the values 0-3, corresponding to the 4 machine words of a cache line.

The remaining most significant bits of the memory address may be included in the second portion, the tag 335, in some embodiments. As compared to the cache of FIG. 2, the tag 335 may include both the corresponding index 234 and tag 236 portions of the memory address.

The tag 335 may then be input into the scrambler(s) 340 along with one or more CSKs, including a current CSK 341 and optionally one or more previous CSK(s) 342, in some embodiments. The scrambler(s) 340 may modify the tag 335 according to one or more parameterized scrambling functions and the one or more CSKs to generate one or more indexes 334. The index(es) 334 may be used to identify one or more cache sets and the tag 335 may be used to identify the particular memory address in the cache using the tag ram 320, in some embodiments.

In some embodiments, only a current CSK 341, defined for a current time period or epoch, may be active. In this configuration, a scrambler may modify the tag 335 according to the parameterized scrambling function and the current CSK to generate a single index 334. The single index 334 may be used to identify a single cache set and the tag 335 may be used to identify the particular memory address with the single cache set in the cache using the tag ram 320, in these embodiments.

In addition, during periods of transition, one or more previous CSKs may also be active, in some embodiments. These previous CSKs may be defined during previous epochs, or time periods. In this case, multiple CSKs may be used to identify multiple cache sets and the tag 335 may be used to identify the particular memory address with the collective cache sets in the cache using the tag ram 320, in these embodiments. In some embodiments, only one previous CSK may be employed while in other embodiments multiple previous CSKs may be used resulting from multiple overlapping transitions. Any number of previous CSKs may be envisioned and these examples are not intended to be limiting. Further discussion of CSK transitions is provided below with respect to FIGS. 6 and 7.

The scrambler(s) 340 may implement a variety of scrambling functions in various embodiments. In some embodiments, the scrambler may implement a simple scrambling function involving the reordering and/or logical inverting of a limited number of the bits of the tag 335. Such a scrambling function may be useful in cache levels where high performance and low latency are of particular importance, such as in the L1 caches 142 and 144 of FIG. 1. In other embodiments, more complex scrambling functions may be used, such as those involving a greater number of bits of the tag 335 and/or implementing operations of greater complexity such as cryptographic operations or hash functions. Such more complex scrambling functions may trade off increased latency with greater immunity to exploitation and may be suitable for larger, slower caches further from the processor in a multi-level cache hierarchy, such as the LLC cache 134 of FIG. 1. Furthermore, multiple scrambling functions may be employed for a given cache tier with all or part of the CSK serving as a selector for a particular scrambling function, alone or in combination with the CSK serving as a parameter to the particular scrambling function, in various embodiments. These example scrambling functions are not intended to be limiting, however, and any number of scrambling functions may be envisioned.

As compared to the cache of FIG. 2, the index(es) 334 and the corresponding index 224 may have the same number of bits corresponding to the same number of cache sets in the cache, with 2 bits corresponding to 4 cache sets in the respective example cache configurations. In some embodiments, however, the tag 335 and the corresponding tag 236 may have a different number of bits with tags stored in the tag ram 320 using all or only a portion of the tag 335 depending on the scrambling function used and the particular bits scrambled in the memory address. Likewise, in some embodiments the tag ram 320 of FIG. 3 may be different from the tag ram 220 of FIG. 2 due a different number of bits contained with the respective tags.

In some embodiments, for an access of the memory address, the cache may identify one or more cache sets, using the index 334, in the cache where the contents of the memory may be found, then searches each of the ways 0-3 of the identified cache set(s) to see if the tag 335 identifies a respective entry of the tag ram 320. If an entry in the tag ram 320 is identified by the tag 335, then the contents of the memory address is stored in the cache ram 210 in the line associated with the tag ram entry. The cache may then satisfy the memory access using the particular cache line and the offset 232.

FIG. 4 is a flowchart diagram illustrating a process for identifying a set of candidate cache lines to perform a requested memory read access including hardware-assisted obscuring of cache access patterns, according to some embodiments. The process begins at step 400 where a memory read access request is received at a cache, such as the cache 300 of FIG. 3. As shown in 410, the cache may then identify one or more CSKs for the requested memory access, in some embodiments. These CSKs may include a CSK defined according to the current epoch as well as one or more additional CSKs defined according to previous epochs in the case that overlapping epochs are active, such as the overlapping epochs 711 and 712 as shown below in FIG. 7.

As shown in 420, the cache may then divide the address of the memory access into upper and lower portions, where the lower portion, such as the offset 232 as shown in FIG. 3, may be used as an offset into a cache line to access the memory location within the cache while the upper portion, such as the tag 335 of FIG. 3, may be used to locate a cache line containing the contents of the memory location. This division of bits may differ in various embodiments due to the specific configuration of the cache memory.

The cache may then, as shown in 430, apply a scrambling function using a scrambler, such as a scrambler 340 of FIG. 3, to some or all of the upper portion of the address bits of the memory location being addressed. The scrambling function may be applied according to each of the identified CSKs to generate scrambled portion(s) of the memory address, such as the index(es) 334 of FIG. 3, specific to the respective identified CSKs. In some embodiments, relatively few of the bits of the upper portion may be scrambled while in other embodiments more of the bits of the upper portion may be scrambled depending on the security and performance requirements of the cache.

The scrambled portions of the memory address, such as the index(es) 334 of FIG. 3, may then be used to identify respective sets of candidate cache locations that may contain the requested memory contents. The cache may then further use, as shown in 440, at least some of the upper portion of the memory address, such as the tag 335 of FIG. 3, to serve as a cache tag identifying the memory address within the cache by comparing the cache tag to entries in a tag ram, such as the tag ram 320 of FIG. 3, that correspond to individual ones of the identified cache sets.

As shown in 450, the received access request may then be satisfied using an identified cache line from the above cache tag comparison, should the comparison result in a matching cache line. If no cache line in the identified cache sets be identified, the access request may then be satisfied using memory, such as the memory 132 as shown in FIG. 1.

FIG. 5 is a flowchart diagram illustrating a process for invalidating a cache location for a memory write access including hardware-assisted obscuring of cache access patterns, according to some embodiments. The process begins at step 500 where a memory write access request may be received at a cache, such as the cache 300 of FIG. 3. As shown in 510, the cache may then identify one or more CSKs for the requested memory access, in some embodiments. These CSKs may include a CSK defined according to the current epoch as well as one or more additional CSKs defined according to previous epochs in the case that overlapping epochs are active, such as the overlapping epochs 711 and 712 as shown below in FIG. 7.

As shown in 520, the cache may then divide the address of the memory access into upper and lower portions, where the lower portion, such as the offset 232 as shown in FIG. 3, may be used as an offset into a cache line to access the memory location within the cache while the upper portion, such as the tag 335 of FIG. 3, may be used to locate a cache line containing the contents of the memory location. This division of bits may differ in various embodiments due to the specific configuration of the cache memory.

The cache may then, as shown in 530, apply a scrambling function using a scrambler, such as a scrambler 340 of FIG. 3, to some or all of the upper portion of the address bits of the memory location being addressed. The scrambling function may be applied according to each of the identified CSKs to generate scrambled portion(s) of the memory address, such as the index(es) 334 of FIG. 3, specific to the respective identified CSKs. In some embodiments, relatively few of the bits of the upper portion may be scrambled while in other embodiments more of the bits of the upper portion may be scrambled depending on the security and performance requirements of the cache.

The scrambled portions of the memory address, such as the index(ex) 334 of FIG. 3, may then be used to identify respective sets of candidate cache locations that may contain the requested memory contents. The cache may then further use, as shown in 540, at least a portion of the memory address, such as the tag 335 of FIG. 3, to serve as a cache tag identifying the memory address within the cache by comparing the cache tag to entries in a tag ram, such as the tag ram 320 of FIG. 3, that correspond to individual ones of the identified cache sets.

As shown in 560, the cache may then determine if a cache line has been identified from the above cache tag comparison. Should a cache line not be identified, as indicated by a negative exit from 560, the write access may be satisfied according to a cache miss as shown in 564. Should a cache line be identified, as indicated by a positive exit from 560, a determination may be made in some embodiments whether the identified cache line is a member of a set of cache lines identified according to a previous epoch, as shown in 562.

Should the cache line not be a member of a set of cache lines identified according to a previous epoch, as indicated by a negative exit from 562, the write access may be satisfied according to a cache hit as shown in 566. Should the cache line be a member of a set of cache lines identified according to a previous epoch, as indicated by a positive exit from 562, the write access may be satisfied using to a cache hit of a previous epoch, as shown in 568. Various embodiments for satisfying a write access request using a cache hit of a previous epoch are discussed below in FIGS. 5B, 5C and 5D.

Figure 5A:
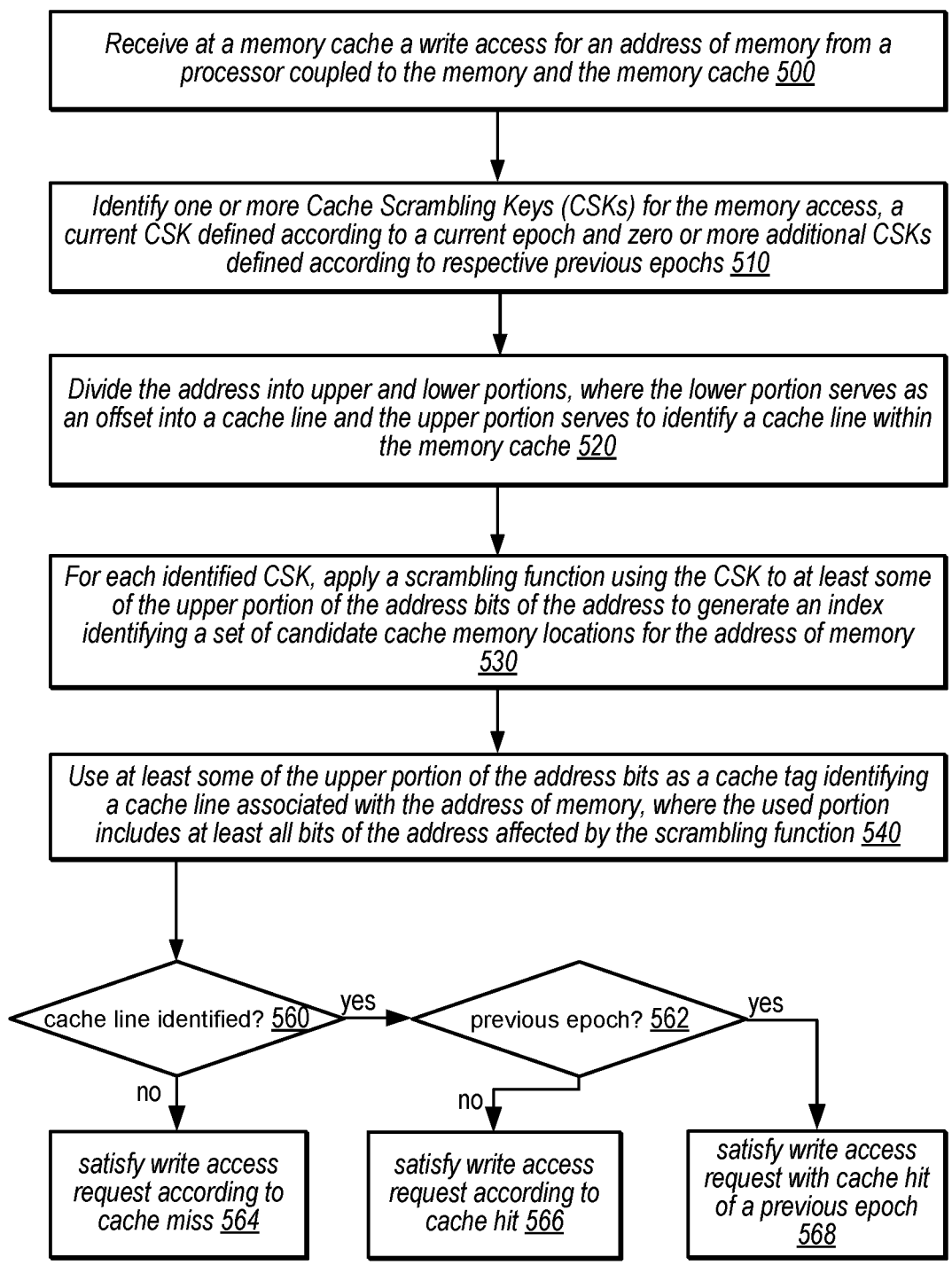
FIG. 5A is a flowchart diagram illustrating a process for performing a memory write access including hardware-assisted obscuring of cache access patterns, according to some embodiments.
Figure 5B:
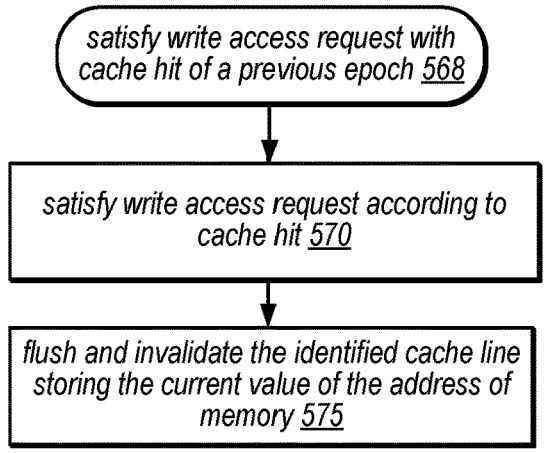
FIGS. 5B, 5C and 5D are flowchart diagrams illustrating various embodiments of a process for performing a memory write access using a cache location contain memory write data located according to a previous epoch.

FIG. 5B is flowchart diagram illustrating an embodiment of a process for performing a memory write access using a cache location containing memory write data located according to a previous epoch. The process begins at step 570 where a received write access request may be satisfied using a cache memory location identified as containing a value of the memory location. Various memory write techniques may be employed in various embodiments, including, for example, memory write-through or memory write-back operations. Once the write access has been satisfied, the identified cache location may be flushed, if required, and the cache location invalidated, as shown in 575.

Figure 5C:
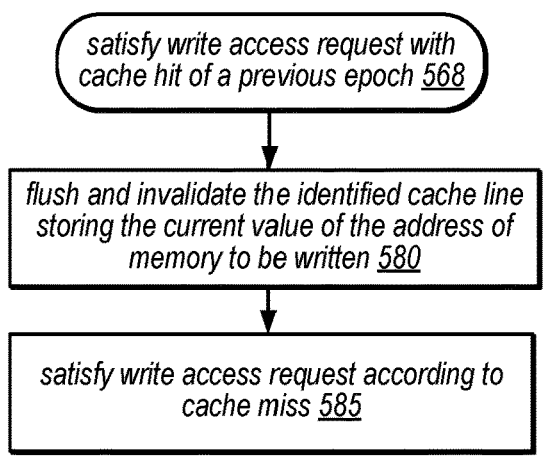

FIG. 5C is flowchart diagram illustrating an embodiment of a process for performing a memory write access using a cache location containing memory write data located according to a previous epoch. The process begins at step 580 where an identified cache location may be flushed, if required, and the cache location invalidated so that the memory location is no longer mapped to any location in the cache. The memory write access may then be satisfied according to a cache miss, as shown in 585.

Figure 5D:
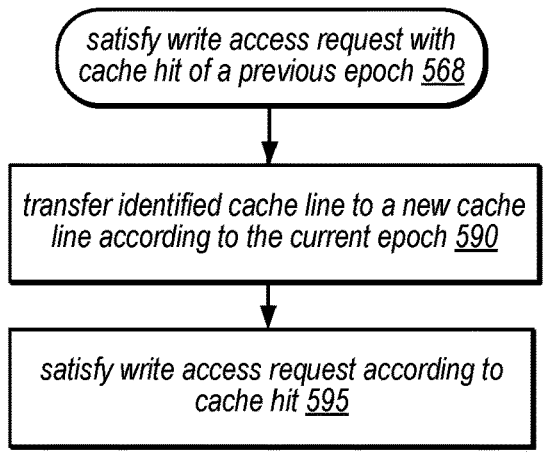

FIG. 5D is flowchart diagram illustrating an embodiment of a process for performing a memory write access using a cache location containing memory write data located according to a previous epoch. The process begins at step 590 where an identified line containing memory write data located according to a previous epoch may be transferred to another cache line that is a member of a set of cache lines identified by a current epoch. The transfer may be performed in a number of ways in various examples. For example, the cache line may be remapped, the cache line may be copied to a different cache line, or the cache line flushed and invalidated, then a new cache loaded with the write data. These examples are not intended to be limiting, and any number of ways for transferring the memory write data to a cache line located by the current epoch may be employed in various embodiments.

Once the identified cache line is transferred to a location in the cache according to a current epoch, the memory write request may be satisfied according to a cache hit using the newly allocated cache line, as shown in 595. Various memory write techniques may be employed in various embodiments, including, for example, memory write-through or memory write-back operations.

Figure 6:
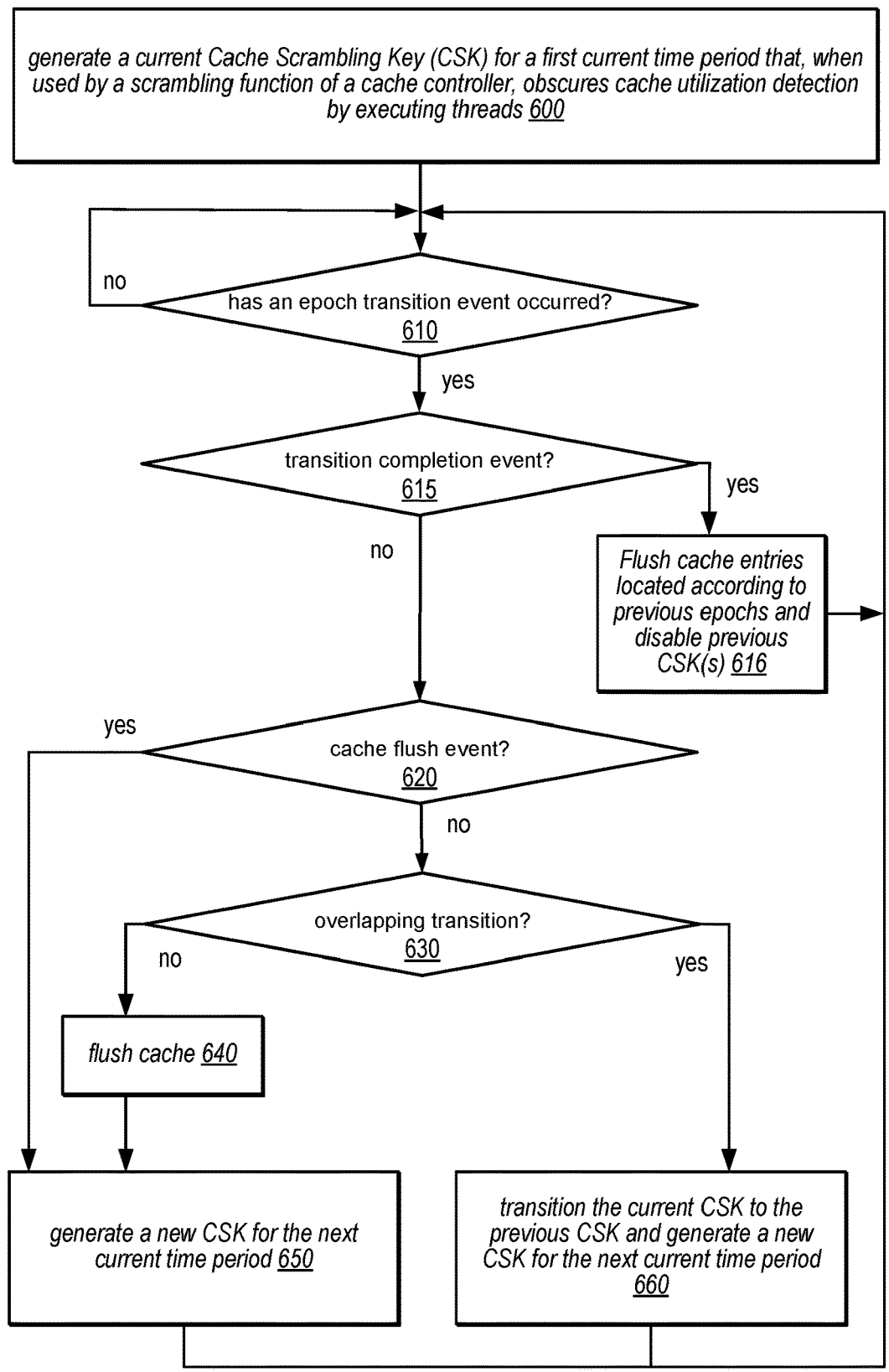
FIG. 6 is flowchart diagram illustrating a process for updating cache scrambling keys, according to some embodiments.
Figure 7:
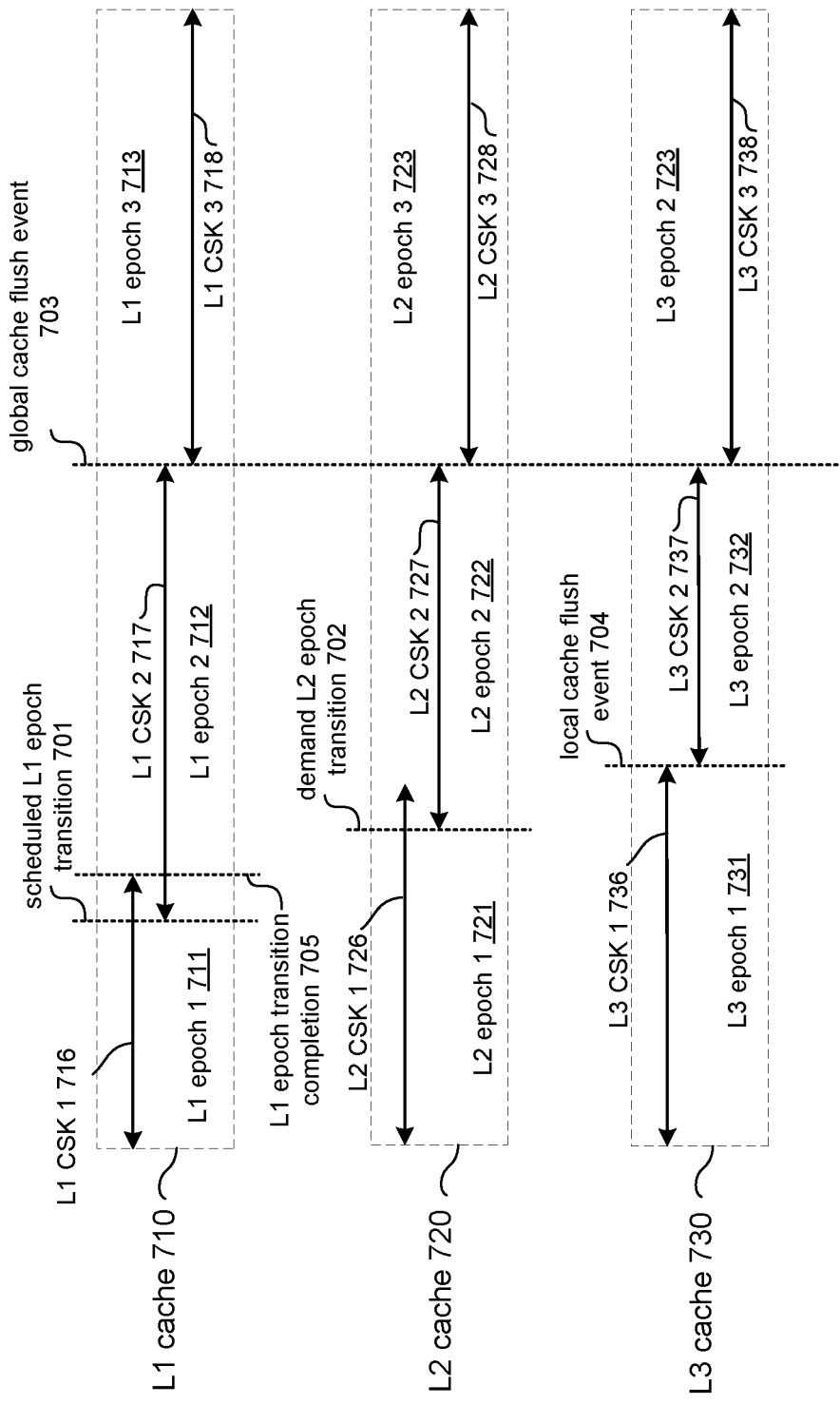
FIG. 7 illustrates sequences of cache epochs and epoch transitions, according to some embodiments.

FIG. 6 is flowchart diagram illustrating a process for updating cache scrambling keys, according to some embodiments. As shown in 600, an initial CSK may be generated by a key manager, such as the key manager 125 as shown in FIG. 1, for a first time period, or epoch, in a series of time periods for a tier of a cache memory, such as the L1, L2 and L3 caches as shown in FIG. 1, in some embodiments. The process may proceed to step 610 where the process waits for a cache epoch transition event to occur. Once a transition event occurs, as indicated by a positive exit from step 610, the process may proceed to step 615 where it may be determined if the transition event is due to a transition completion event, such as an event associated with the L1 epoch transition completion 705 as shown in FIG. 7 below. If the transition event is not due to a transition completion event, as indicated by a negative exit from step 615, the process may proceed to step 620.

If, however, the transition event is due to a transition completion event, as indicated by a positive exit from step 615, the process may proceed to step 616 where any cache entries of one or more cache tiers associated with previous epochs identified by the transition completion event may be flushed and invalidated such that no cache tier identified by the transition completion event contains cache lines mapped according to previous epochs. Prior to invalidation of these cache entries, in some embodiments the cache entries may be optionally transferred, copied or loaded into cache entries mapped according to a current epoch in order to further improve performance of the cache subsystem. The process may then disable all previous CSK(s), such as the previous CSK(s) 342 as shown in FIG. 3, such that overlapping transitions of affected cache tiers may terminated.

As shown in 640, the process may be determine if the transition event is due to a cache flush event. If the transition is caused by a cache flush event, as indicated by a positive exit from step 620, the process may proceed to step 650 where a new CSK is generated and used as the current CSK for a next cache epoch, in some embodiments. The process then returns to step 610.

If the transition is not caused by a cache flush event, as indicated by a negative exit from step 620, the process may proceed to step 630 where it may be determined if an overlapping transition is to be implemented.

If an overlapping transition is not to be implemented, as indicated by a negative exit from step 630, the process may proceed to step 640 where the cache is flushed. The process may then proceed to step 650, as discussed above, in some embodiments.

If an overlapping transition is to be implemented, as indicated by a positive exit from step 630, the process may proceed to step 660 where the current CSK for the current epoch is transitioned to a previous CSK and a new CSK is generated and used as the current CSK for a next cache epoch, in some embodiments. In some embodiments, a deterministic or predictable termination of an overlapping transition may be desirable, for example in order to manage power consumption within a cache subsystem. For this reason, in some embodiments a transition completion event may be additionally scheduled to ensure that previous CSK(s) may be retired in a deterministic timeframe, such as is discussed above regarding step 616. In other embodiments, a cache scrubbing or cache transfer operation may be additionally scheduled to ensure timely termination of the overlapping transition, with a transition completion event generated upon termination of the cache scrubbing or cache transfer operation. These examples of overlapping transition completion, however, are not intended to be limiting and any number of methods to termination an overlapping transition may be employed. The process then returns to step 610.

In some embodiments, overlapping transitions may result in more than one active CSK existing during epoch transitions. As discussed in FIG. 4, active cache entries for previous epochs may be invalidated either through cache flush operations or through writes to memory locations which may be active in the cache. Thus, overlapping transitions may occur, enabling cache epoch transitions with minimized cache performance penalty.

It should also be understood that epoch transition events may occur during periods of overlapping transitions, in some embodiments. In the case that a transition event is the result of a cache flush operation, the overlapping epoch transition may be immediately terminated, in some embodiments. If, however, the transition event is not a result of a cache flush operation, a new overlapping transition may be initiated, resulting on multiple previous active CSKs, in some embodiments. Furthermore, different epoch transition strategies may be implement for different cache tiers. For example, an L1 cache may implement overlapping transitions on a relatively frequent, periodic schedule while an L2 cache may use a less frequent periodic or demand schedule with overlapping transitions and an L3 may use only infrequent, non-overlapping epoch transitions based on cache flush operations. These examples, however, are not intended to be limiting and any number of epoch transition strategies may be envisioned.

FIG. 7 illustrates sequences of cache epochs, or cache time periods, and epoch transitions, according to some embodiments. In some embodiments, a cache memory subsystem make include an L1 cache 710, an L2 cache 720 and an L3 cache 730, such as the L1 D-cache and I-cache 142 and 144, the L2 cache 146 and the shared last level (L3) cache 134 as shown in FIG. 1. Each of the respective cache tiers 710, 720 and 730 may have unique cache epoch sequences, such as L1 epochs 711, 712 and 713, L2 epochs 721, 722 and 723, and L3 epochs 731 and 732.

As illustrated in FIG. 7, each cache level may begin with a respective first defined epoch, the L1 cache 710 starting with L1 epoch 1 711 as the current epoch, the L2 cache 720 starting with L2 epoch 1 721 as the current epoch and the L3 cache 730 starting with L3 epoch 1 731 as the current epoch. A current CSK may be associated with each of these epochs in some embodiments, the L1 CSK 1 716 associated with the L1 epoch 1 711, the L2 CSK 1 726 associated with the L2 epoch 1 721 and the L3 CSK 1 736 associated with the L3 epoch 1 731, in some embodiments. Responsive to a variety of epoch, or cache time period, transition events, a cache memory subsystem may transition various cache tiers to new cache epochs, or cache time periods, in various embodiments.

As shown in 701, L1 epoch 1 711 may transition to L1 epoch 2 712 based on a periodic or aperiodic schedule. At the scheduled L1 epoch transition 701, in some embodiments an L1 CSK 2 717 may be defined as the current CSK and the L1 CSK 1 716 transitioned from the current CSK to the previous CSK. For a period of time after the transition 701, both CSKs may be active, as discussed above in FIGS. 3 and 4. Scheduled transitions, such as the transition 701, may be determined based on the specific cache level, memory configuration, or other factors and any number of considerations may effect transition scheduling, with the current examples not intended to be limiting.

As shown in 705, an overlapping transition from L1 epoch 1 711 to L1 epoch 2 712 may be terminated by a L1 epoch transition completion 704. In some embodiments, a deterministic or predictable termination of an overlapping transition may be desirable, for example in order to manage power consumption within a cache subsystem. For this reason, in some embodiments a transition completion event may be additionally scheduled to ensure that previous CSK (s), such as the L1 CSK 1 716, may be retired in a deterministic timeframe, while in other embodiments a transition completion event may be triggered by completion of a cache scrubbing or cache transfer event scheduled to assist in a timely retirement of an overlapping epoch transition.

As shown in 702, L2 epoch 1 721 may transition to L2 epoch 2 722 based on a determined demand such as a perceived threat, detected application behavior, etc. Such determined demands are merely examples and are not intended to be limiting. At the scheduled L2 epoch transition 702, in some embodiments an L2 CSK 2 727 may be defined as the current CSK and the L2 CSK 1 726 transitioned from the current CSK to the previous CSK. For a period of time after the transition 702, both CSKs may be active, as discussed above in FIGS. 3 and 4.

As shown in 703, a cache flush event 703 may trigger an opportunistic global epoch transition in some or all tiers of a cache memory in some embodiments. Such cache flush events may occur as a result of executing software, such as the software 110 as shown in FIG. 1, or as a result of hardware events such as power management events that occur with a system. In the illustrated example, a cache flush event 703 may cause an epoch transition in all tiers of the cache memory. L1 epoch 2 712 may transition to L1 epoch 3 713, L2 epoch 2 722 may transition to L2 epoch 3 723 and L3 epoch 2 732 may transition to L3 epoch 3 733. As a cache flush event may invalidate all cache entries of a cache tier, a non-overlapping transition may occur without further performance penalty. As shown in 703, an L1 CSK 3 78 may be defined as the current L1 CSK, an L2 CSK 3 728 may be defined as the current L2 CSK and an L3 CSK 3 738 may be defined as the current L3 CSK. No previous CSKs are required to remain active during the transition as a result of the cache flush event.

As shown in 704, a cache flush event 703 may trigger an opportunistic local epoch transition in a single tier of a cache memory in some embodiments. In the illustrated example, a cache flush event 704 may cause an epoch transition in a tier of the cache memory. For example, L3 epoch 1 731 may transition to L3 epoch 2 732. As a cache flush event may invalidate all cache entries of a cache tier, a non-overlapping transition may occur without further performance penalty. As shown in 704, an L3 CSK 2 737 may be defined as the current L3 CSK. No previous CSKs are required to remain active during the transition as a result of the cache flush event.

Figure 8:
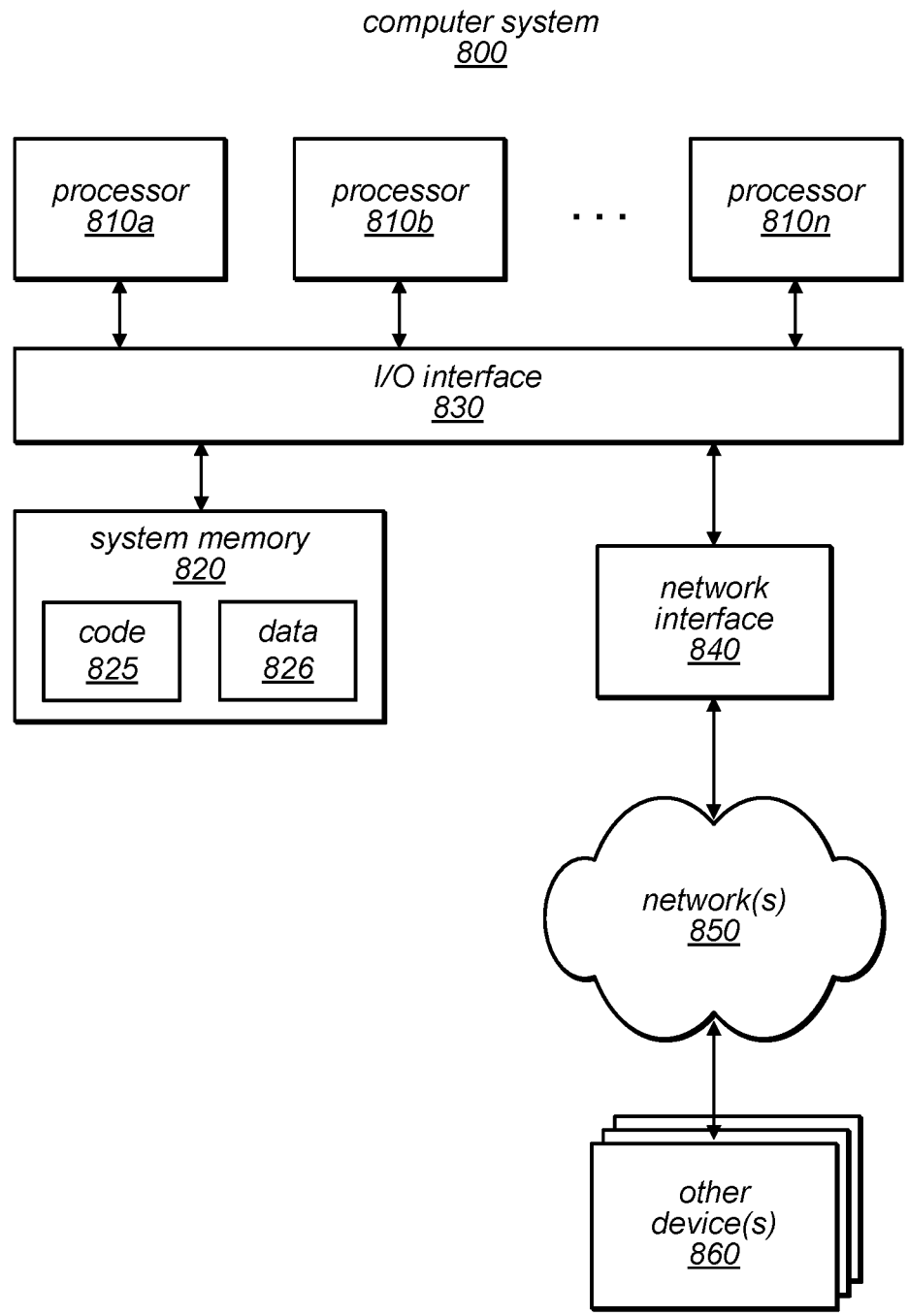
FIG. 8 is a block diagram illustrating an example computer system that mitigates side-channel attacks using a shared cache, according to some embodiments.

FIG. 8 is a block diagram illustrating an example computer system that mitigates side-channel attacks using a shared cache, according to some embodiments. Computer system 800 may include or be configured to access one or more nonvolatile computer-accessible media. In the illustrated embodiment, computer system 800 includes one or more processors 810 coupled to a system memory 820 via an input/output (I/O) interface 830. Computer system 800 further includes a network interface 840 coupled to I/O interface 830.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code 825 and data 826. The system memory 820 may include different levels of cache, some of which may be located on the processor and some away from the processor. One level of the cache hierarchy may be a last level cache that is shared by all of the processors 810*a* to 810*n*. The last level cache may be an inclusive cache of the low levels of cache in the cache hierarchy.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices, such as routers and other computing devices. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above for FIGS. 1 through 7 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium, such as a network and/or a wireless link, such as may be implemented via network interface 840.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Those skilled in the art will appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 800 may be transmitted to computer system 800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

The various methods as illustrated in the Figures and described herein represent example embodiments of methods. The methods may be implemented in software, hardware, or a combination thereof. The order of method may be changed, and various items may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for handling cached memory transactions, comprising:
    responsive to receiving an access to a memory address:
        identifying a first set of candidate cache locations mapping to the memory address using a scrambling function that alters a first portion of the memory address according to a first scrambling key selected for a current time period; and
        identifying a second set of candidate cache locations mapping to the memory address using the scrambling function that alters a second portion of the memory address according to a second scrambling key selected for a previous time period, wherein the previous and current time periods are different overlapping time periods, and wherein the second set of candidate cache locations differs from the first set of candidate cache locations.

2. The method of claim 1, further comprising:
    performing the requested access to memory using a cache location of the first set of candidate cache locations responsive to determining that the cache location of the first set of candidate cache locations is currently mapped to the memory address; and
    performing the requested access to memory using a cache location of the second set of candidate cache locations responsive to determining that the cache location of the second set of candidate cache locations is currently mapped to the memory address.

3. The method of claim 1, wherein the first set of candidate cache locations and the second set of candidate cache locations correspond to a first cache tier of a multi-tiered cache, and wherein the method further comprises:
    identifying a third set of candidate cache locations of a second cache tier of the multi-tiered cache mapping to the memory address according to a second scrambling function that alters a third portion of the memory address according to a third scrambling key selected for a third time period, wherein the second scrambling function is different from the scrambling function, and wherein the third time period is different from the current and previous time periods.

4. The method of claim 3,
    wherein the previous time period and the current time period are time periods of a sequence of overlapping time periods for the first cache tier; and
    wherein the third time period is a time period of a sequence of non-overlapping time periods for the second cache tier.

5. The method of claim 4, further comprising:
    responsive to detection of a cache time period transition event for the second cache tier, selecting a fourth scrambling key for a fourth time period of the sequence of non-overlapping time periods for the second cache tier; and
    replacing the third scrambling key with the selected fourth scrambling key to transition the second cache tier to the fourth time period.

6. The method of claim 1, further comprising:
    selecting a cache location for replacement responsive to identifying the cache location as mapped to a particular memory location according to the previous time period.

7. The method of claim 1, wherein the memory address is a virtual address.

8. The method of claim 1, wherein the memory address is a physical address.

9. A cache controller interfacing one or more processors to memory, configured to:
responsive to receiving an access to a memory address:
identify a first set of candidate cache locations mapping to the memory address using a scrambling function that alters a first portion of the memory address according to a first scrambling key selected for a current time period; and
identify a second set of candidate cache locations mapping to the memory address using the scrambling function that alters a second portion of the memory address according to a second scrambling key selected for a previous time period, wherein the previous and current time periods are different, overlapping time periods, and wherein the second set of candidate cache locations differs from the first set of candidate cache locations.

10. The cache controller of claim 9, further configured to:
perform the requested access to memory using a cache location of the first set of candidate cache locations responsive to determining that the cache location of the first set of candidate cache locations is currently mapped to the memory address; and
perform the requested access to memory using a cache location of the second set of candidate cache locations responsive to determining that the cache location of the second set of candidate cache locations is currently mapped to the memory address.

11. The cache controller of claim 10, further configured to:
identify a third set of candidate cache locations of a second cache tier of the multi-tiered cache mapping to the memory address according to a second scrambling function that alters third portion of the memory address according to a third scrambling key selected for a third time period, wherein the second scrambling function is different from the scrambling function, and wherein the third time period is different from the current and previous time periods.

12. The cache controller of claim 10, wherein:
the previous time period and the current time period are time periods of a sequence of overlapping time periods for the first cache tier; and
the third time period is a time period of a sequence of non-overlapping time periods for the second cache tier.

13. The cache controller of claim 12, further configured to:
responsive to detection of a cache time period transition event for the second cache tier, select a fourth scrambling key for a fourth time period of the sequence of non-overlapping time periods for the second cache tier, wherein the transition event comprises a cache flush event, a scheduled transition event or a demand transition event; and
replace the third scrambling key with the selected fourth scrambling key to transition the second cache tier to the fourth time period.

14. The cache controller of claim 9, further configured to:
select a cache location for replacement responsive to identifying the cache location as mapped to a particular memory location according to the previous time period.

15. A system, comprising:
one or more hardware processors and memory, including a main memory and a shared cache for the main memory;
a cache controller for the shared cache configured to receive an access to a memory address within the main memory, and responsive to the receipt of the access:
scramble a first portion of the memory address according to a first scrambling key for a current time period to generate a first index;
identify a first set of candidate cache locations in the shared cache that map to the memory address using the generated first index;
scramble a second portion of the memory address according to a second scrambling key for a previous time period to generate a second index;
identify a second set of candidate cache locations in the shared cache mapping to the memory address using the generated second index;
perform the access to the memory location using a cache location of the first set of candidate cache locations responsive to determining that the cache location of the first set of candidate cache locations is currently mapped to the memory address; and
perform the access to the memory location using a cache location of the second set of candidate cache locations responsive to determining that the cache location of the second set of candidate cache locations is currently mapped to the memory address.

16. The system of claim 15,
wherein the shared cache is a multi-tiered cache;
wherein the first set of candidate cache locations and the second set of candidate cache locations correspond to a first cache tier of the multi-tiered cache; and
wherein, responsive to receiving the access, the cache controller is further configured to:
scramble a third portion of the memory address according to a third scrambling key for a third time period to generate a third index;
identify a third set of candidate cache locations of a second cache tier of the multi-tiered cache mapping to the memory address using the generated third index; and
perform the access to the memory location using a cache location of the third set of candidate cache locations responsive to determining that the cache location of the third set of candidate cache locations is currently mapped to the memory address.

17. The system of claim 16,
wherein the previous time period and the current time period are time periods of a sequence of overlapping time periods for the first cache tier; and
wherein the third time period is a time period of a sequence of non-overlapping time periods for the second cache tier.

18. The system of claim 15, the cache controller further configured to:
select a cache location for replacement responsive to identifying the cache location as mapped to a particular memory location according to the previous time period.

* * * * *